United States Patent [19]

Fincher

[11] Patent Number: 4,807,107
[45] Date of Patent: Feb. 21, 1989

[54] APPARATUS FOR PROVIDING A PROFILED TAPE TENSION WITHOUT UTILIZING A TAPE PACK DIAMETER SENSOR

[75] Inventor: Jeffrey L. Fincher, San Bruno, Calif.

[73] Assignee: Ampex Corporation, Redwood City, Calif.

[21] Appl. No.: 89,273

[22] Filed: Aug. 25, 1987

[51] Int. Cl.⁴ .................. G11B 15/43; G11B 15/28; B65H 77/00
[52] U.S. Cl. ..................... 364/148; 242/75; 242/75.42; 242/75.43; 242/75.44; 242/190; 360/74.3; 364/167.01
[58] Field of Search ............. 364/148, 469, 142; 242/75.5, 75.42, 75.43, 75.47, 190, 150, 188, 186; 360/73, 72.3, 74.3; 318/6

[56] References Cited

U.S. PATENT DOCUMENTS

| | | | |
|---|---|---|---|
| 3,189,804 | 6/1965 | Dolphin et al. | 318/6 |
| 3,781,490 | 12/1973 | Phillips | 242/75.5 |
| 3,809,335 | 5/1974 | Mantey | 318/6 |
| 3,834,648 | 9/1974 | Rose, Jr. et al. | 242/186 |
| 3,982,160 | 9/1976 | Goldschmidt et al. | 242/186 |
| 4,097,005 | 6/1978 | Sleger | 242/75.3 |
| 4,213,583 | 7/1980 | Mitani et al. | 318/6 |
| 4,401,923 | 8/1983 | O'Gwynn | 318/6 |
| 4,401,924 | 8/1983 | Grover | 318/6 |
| 4,573,645 | 3/1986 | Harris, Jr. | 242/75.47 |
| 4,696,439 | 9/1987 | Sukigara et al. | 360/73 |

Primary Examiner—Joseph Ruggiero
Assistant Examiner—Paul Gordon
Attorney, Agent, or Firm—Elizabeth E. Strnad; Richard P. Lange

[57] ABSTRACT

A simplified apparatus for providing a profiled tape tension is described which does not require a tape pack diameter sensor. Desired tape tension profile values corresponding to various tape pack diameter values are stored in a tape tension profiler. A control signal indicative of the rotational speed of a takeup reel is applied from a reel servo to the tension profiler which, in turn, changes a tension arm adjustment command in response to changes in the reel speed. The control signal has a known relationship to the tape pack diameter wound on the takeup reel. In the preferred embodiment the control signal is sampled by the tape tension profiler and the samples are used to address a PROM in which the desired tape tension profile values are stored. The thusly addressed tape tension profile values are applied as position command signals to the takeup reel servo which, in turn, changes the position of the tension arm accordingly, thereby obtaining the desired tape tension.

12 Claims, 4 Drawing Sheets

APPARATUS FOR PROVIDING A PROFILED TAPE TENSION WITHOUT UTILIZING A TAPE PACK DIAMETER SENSOR

The invention described herein was made in the course of Contract No. 85*I176380*000 awarded by the U.S. Government.

The invention relates to an apparatus for controlling tape tension during the transport of a tape between a supply reel and a takeup reel in accordance with a desired tape tension profile.

BACKGROUND OF THE INVENTION

There are known transport mechanisms for transporting a tape between two reels on which the opposite ends of the tape are secured. The reel from which the tape is unwinding is generally referred to as a supply reel and the reel on which it is being wound is generally referred to as a takeup reel. When the tape is transported longitudinally in a forward direction, the effective diameter of the tape pack wound on the supply reel is decreasing while it is increasing on the takeup reel.

For example, in magnetic recording/reproducing devices a magnetic tape is transported past one or more electromagnetic transducers which may record an information signal on the tape or reproduce an information signal which has been previously recorded on the tape. During the recording and reproducing processes the longitudinal tape speed is accurately controlled, generally by a capstan servo, which drives the tape at a selected constant speed past the transducers, as it is well known in the art of magnetic tape recording and reproduction. As the tape is being wound progressively on the takeup reel, it is important to control the tape tension to avoid winding of the tape pack too tightly or too loosely. Winding the tape too tightly consumes excess power and may damage the integrity of the tape pack, or the tape itself, thereby jeopardizing the recorded information. On the other hand, when the tape is wound too loosely it may also adversely affect the integrity of the tape pack, or cause sliding of the tape off the reel or other parts of the transport, thereby loosing valuable information signal. To avoid the foregoing problems, magnetic tape recording/reproducing devices are known to utilize tension arms which are arranged in contact with the tape along the tape path. The rotation of the takeup and supply reels is controlled to maintain the tension arms in a desired position during the recording and playback operation, which position corresponds to a desired tape tension.

To obtain the foregoing, a position servo, generally referred to as the reel servo, is utilized in a well known manner. Generally, the reel servo receives a position command signal corresponding to a desired position of the tension arm, and a negative feedback position signal, corresponding to its actual position. The servo provides an error signal corresponding to a difference between the received signals and it applies a control signal to accelerate or decelerate the reel until the position error signal becomes zero. By rotating the reel faster or slower, the position of the tension arm changes, thereby changing the tape tension to tighten or loosen the tension within the tape pack on the reel, until the desired tape tension is obtained. Thus the position of the tension arm is servoed by controlling the rotation of the reel, while the longitudinal tape speed remains constant.

However, as the tape pack diameter changes during operation, it is often required to change the desired tape tension in accordance with a desired tape tension profile. Tape tension profiling generally facilitates the use of lower tape tension values, as it is for example desirable in applications where low power consumption is an important consideration. There are known tape recording/reproducing or tape conditioning devices which change the position command signal for the tension arm as the diameter of the tape pack on the takeup reel increases or decreases, to obtain optimum tension within the pack during the entire operation. These known devices utilize tape pack diameter sensors for measuring the changing diameter of the tape pack wound on the takeup reel. In response to the measured tape pack diameter, the known tape tension profiler may adjust the desired tape tension by changing the tension arm position, or the spring tension applied to the tension arm, or by changing the takeup reel torque where a tension arm is not used. For example, to change the tension arm position, the known tape tension profiler would change the tension arm position command signal to the takeup reel servo, which in turn rotates the takeup reel, until the tension arm is repositioned to a desired position. Thus a new position of the tension arm corresponds to a new desired tension of the tape wound on the reel which, in turn, is obtained as a function of the measured tape pack diameter. It is generally referred to the above-indicated function as a tape tension profile. For example, some tape conditioner manufacturers recommend tape tension profile values which have higher tape tensions closer to the beginning and end of the tape pack, that is near to minimum and maximum tape pack diameters, and lower tensions at intermediate diameters.

In recording/reproducing applications where it is desirable to simplify the tape transport because of space or weight restrictions, such as in aircraft or satellites, or where there is no immediate access to the apparatus during the recording operation, such as in remotely controlled devices, proper control of tape tension is even more important because usually there is no backup recorder, and valuable data may be irretrievably lost due to poor tape pack integrity or tape damage.

SUMMARY OF THE INVENTION

Accordingly, the present invention is related to a simplified apparatus for providing a profiled tape tension, without utilizing a tape pack diameter sensor. In accordance with the invention, a tape tension profiler stores desired tape tension profile values. A control signal which has a known relationship to the speed of the takeup reel is obtained from a reel servo or servos and applied to the tape tension profiler. Because the rotational speed of the servoed takeup reel is proportional to the diameter of the tape pack wound thereon, the control signal determining the rotational speed of the reel also has a known relationship to the changing diameter of the tape pack. Consequently, the tape tension profiler of the invention utilizes that control signal as an indicator of the tape pack diameter, and in response thereto, it applies a corresponding tension arm adjustment command in accordance with the stored tape tension profile to adjust the desired tape tension.

In the preferred embodiment of the invention the control signal is obtained as a control voltage from the takeup reel servo which is proportional to the rotational speed of the takeup reel, while the tape speed is maintained constant. In an alternative embodiment a ratio of control voltages is provided, corresponding to a ratio of the supply and takeup reel speeds obtained from a supply and a takeup reel servo is utilized as the control voltage. In this alternative embodiment the tape speed does not need to be constant.

In a still alternative embodiment the tension arm adjustment signal is applied to adjust a tension arm spring.

In the preferred embodiment of the invention the tension profiler utilizes a sample and hold circuit to which a control signal is applied from the reel servo. That control signal is proportional to the speed of rotation of the takeup reel and therefore, also to the diameter of the tape pack wound on the reel. The sample and hold circuit samples the control signal and the resulting analog samples are converted to binary form by an analog-to- digital (A/D) converter. A programmable read only memory (PROM) stores various tape tension profile values, that is desired tape tension values corresponding to respective tape pack diameter values. The output signal from the A/D converter addresses the PROM, and a thusly addressed desired tape tension value from the PROM corresponding to a particular tape pack diameter as indicated by the signal from the A/D converter, is retrieved and converted to analog form by a digital-to-analog (D/A) converter. The thusly obtained analog signal is applied to the takeup reel servo as the tension arm position command signal, which corresponds to the above-described tension arm adjustment command.

The takeup reel servo in the preferred embodiment utilizes a voltage controlled oscillator which receives a control voltage from a servo compensator. The output signal from the oscillator is applied to a motor drive amplifier (MDA) which controls a reel motor in a well known manner. It follows from the foregoing description that in the preferred embodiment the control voltage applied to the oscillator is representative of the rotational speed of the takeup reel. That voltage is applied to the sample and hold circuit as a control signal representing the tape pack diameter on the takeup reel. Consequently, the use of a tape pack diameter detector as it is known from prior art tape tension profilers is eliminated in accordance with the present invention. However, the invention is not restricted to the use of that particular control voltage as the control signal. Alternatively, other signals provided by the servo, which signals are indicative of the takeup reel speed may be utilized instead.

As it is well known in the art, the diameter of the tape pack is proportional to both the rotational speed of the reel and the tape speed. Consequently, in the preferred embodiment of the invention the tape speed is maintained constant and thus the tape pack diameter is proportional to the rotational speed of the takeup reel. In an alternative embodiment the control signal indicative of the diameter of the tape pack on the takeup reel is proportional to a ratio of the speed of rotation of the supply reel and of the takeup reel. Dependence of the resulting control signal on the tape speed is thereby eliminated.

The foregoing and further features, objects and advantages of the invention will be better understood from the following description with reference to the accompanying drawings in which different embodiments are illustrated as examples. The drawings are included for the purpose of disclosure and illustration only, and are not intended as limitation of the scope of the invention.

DETAILED DESCRIPTION

Figure 1:
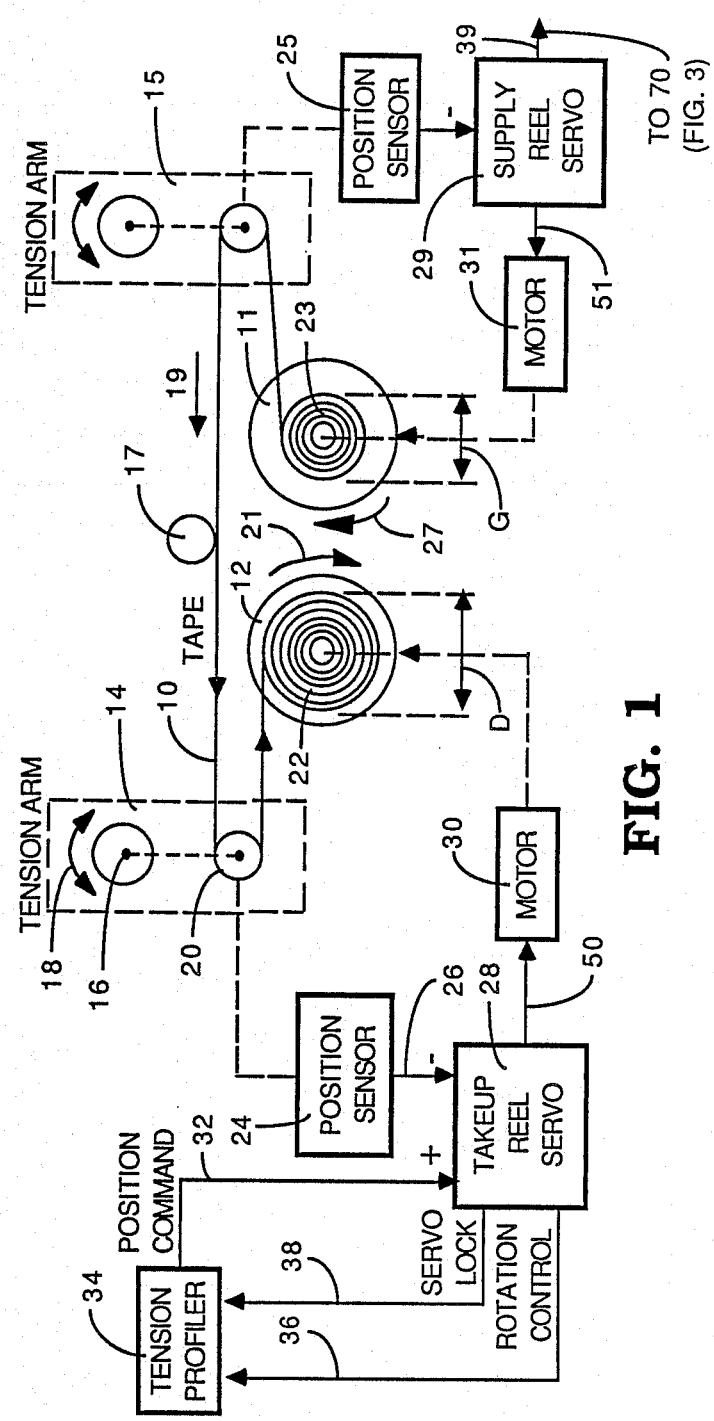
FIG. 1 is a simplified functional block diagram showing an apparatus for providing a profiled tape tension in accordance with the preferred embodiment of the invention, where a tension arm adjustment command is applied to a position servo as a position command signal.

FIG. 1 shows a magnetic tape 10 as being transported, for example, in a magnetic tape recording/reproducing device, from a supply reel 11 to a takeup reel 12 in a manner well known in the art. Only a portion of a conventional tape transport mechanism is shown, including the supply reel 11, takeup reel 12, tension arms 14, 15 and a capstan 17. The tension arm 14 is spring loaded and is pivotally mounted at one end to a housing structure supporting the tape transport mechanism, and is pivoted around an axis 16 in the direction of arrows 18. The tape 10 passes from the supply reel 11 to the takeup reel 12 around the supply tension arm 15, capstan 17 and takeup tension arm 14. It is in contact with a tape guiding surface 20 arranged at another end of the arm 14, opposite the pivoted end. When the takeup reel 12 rotates in a forward direction 21 the tape is being progressively wound thereon while the diameter D of a tape pack 22 increases. At the same time the supply reel 11 rotates in the direction 27 and the diameter G of the tape pack 23 thereon decreases proportionally, as it is well known. A position sensor 24 is utilized to detect the actual position of the tension arm 14 with respect to a nominal position corresponding to a nominal tape tension on the takeup reel 12. By the nominal tape tension there is understood an average desired tape tension value utilized, for example, during a start up mode before servo lock is achieved, as it will be described later in more detail. The position sensor may be of a well known type, such as electromagnetic or optical. The output signal from the position sensor 24 on line 26 indicates the actual position of the tension arm with respect to the nominal position.

With further reference to FIG. 1, a takeup reel servo 28 is utilized to control the speed of rotation of a conventional reel motor 30, which in turn drives the takeup reel 12, in a well known manner. In the preferred embodiment the servo 28 is implemented as a position servo which receives via line 32 a tension arm adjustment command from a tension profiler 34 as a position command signal. The tension profiler also receives via line 36 a control signal from the servo 28, which signal determines the rotational speed of the reel 12. As it is has been described previously, the tape pack diameter D is proportional to the speed of rotation of reel 12 and to the tape speed in the longitudinal direction 19. Because in the presently described embodiment the tape speed is maintained constant, the control signal on line 36 is proportional to the diameter D of the tape pack wound on reel 12. Consequently, the tension profiler in accordance with the preferred embodiment of the invention receives from the reel servo 28 a control signal which has a known relationship to the tape pack diameter on the takeup reel. It is seen from the foregoing description that the apparatus of FIG. 1 utilizes the control signal on line 36 which determines the rotational speed of the reel in the reel servo as an indicator of the size of tape pack wound on the reel. Thus the use of a tape pack diameter sensor such as utilized by the known devices is eliminated.

The rotation of the supply reel 11 is controlled by a supply reel servo 29 by means of a motor 31, utilizing a position sensor 25, analogously with the previously described elements utilized on the takeup reel side in a known manner. Because of the similarities between the takeup and supply reel control circuits, the detailed description with reference to the supply reel control will not be repeated.

The tension profiler 34 of FIG. 1 has a memory in which desired tape tension profile values are stored. Each memory location stores a signal value representing a desired tape tension corresponding to a particular tape pack diameter D on the takeup reel 12. Each tape tension value in turn corresponds to a particular position of the tension arm 14 and is applied by the tension profiler 34 to the takeup reel servo 28 as a tension arm position command signal on line 32, in response to the control signal on line 36 from the reel servo 28.

During normal operation the reel servo 28 controls the position of the tension arm 14 as follows. The position servo receives the above described position command signal via line 32, and the negative feedback signal on line 26 indicating the actual position of the tension arm. The servo sums these two signals and a resulting error signal is processed by the servo and a corresponding processed signal is applied via line 50 to the takeup reel motor 30 which, in turn, controls the speed of rotation of the takeup reel 12 in a well known manner. As it is well known from conventional reel servo operation, the servo will cause the reel 12 to accelerate or decelerate until the actual position signal on line 26 will be equal to the position command signal on line 32 and thus the error signal will be zero. When the foregoing condition is obtained, the signals on lines 26 and 32 are of equal magnitude and thus the tension arm 14 is in a desired position. Thus the desired tape tension is obtained and the rotational speed of the reel remains constant.

As it has been previously indicated, in this embodiment the longitudinal speed of the tape 10 in the direction of arrow 19 is maintained constant by the tape capstan servo (not shown) and the rotational speed of the takeup reel 12 is proportional to the tape pack diameter D. To maintain the constant tape speed, as the diameter of the tape pack increases, that is when rotating in the direction of arrow 21, the reel 12 will rotate proportionally slower, and when rotating in the opposite direction, that is at a decreasing tape pack diameter, the reel will rotate proportionally faster. In either case the reel 12 will rotate in such direction and at such speed, as it is necessary for the position arm 14 to assume the desired position indicated by the position command on line 32. However, with the changing diameter of the tape pack the desired tape tension, and consequently also the desired position of the tension arm 14, will change in accordance with the tension profile values stored in the tension profiler 34. Thus, for example, when there is no change in the position command signal on line 32, the tension arm will remain substantially in the same position, while the speed of rotation of the reel 12 will be changed by the servo 28, if necessary, to maintain the tension arm in the same desired position. In a different situation, when it is desired to change the position of the tension arm, for example because of an increased or decreased diameter of the tape pack, the tension profiler 34 will apply a different position command on line 32 in accordance with the stored profile values. The control signal to the reel motor 30 will then decrease or increase accordingly, in turn causing deceleration or acceleration of the takeup reel, until the tension arm 14 is positioned in the new desired position. Thereafter that position will be maintained by the servo until the next change in the position command signal on line 32 occurs.

A status line 38 is coupled from the servo 28 to the tension profiler 34 to indicate when the servo operates in a locked condition, that is when the tension arm 14 has been within a certain small predetermined distance from the desired position for a given amount of time. The status indication is particularly useful for example during start up or slowdown modes of the servo such as after start or before an off condition, during which modes the operation of the tension profiler is prevented to avoid providing incorrect command signals which may result in servo instability. Preferably during a start up mode the tape tension is initialized to the previously described nominal value until the servo lock is achieved.

Figure 2:
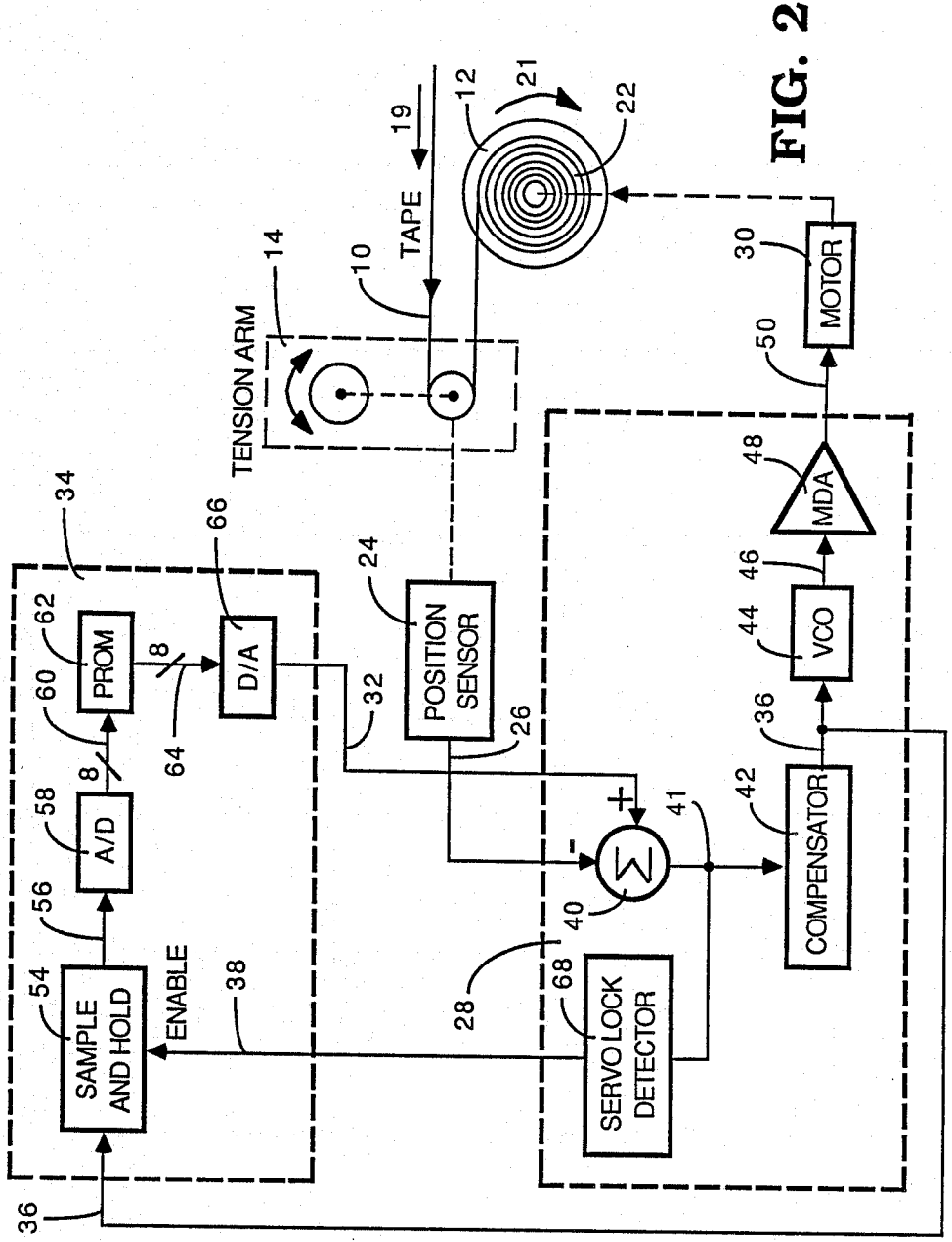
FIG. 2 is a more detailed functional block diagram corresponding to a portion of the block diagram of FIG. 1.

FIG. 2 is a more detailed block diagram of the preferred embodiment shown in FIG. 1. Corresponding circuit elements in all the drawing Figures are designated by like reference numerals to facilitate comparison. Because of the similarities between these Figures, the description of those elements of FIG. 2 which have been already described with reference to FIG. 1 will not be repeated. In FIG. 2 the servo 28 is shown as having a summing junction 40, which receives the previously described position command signal on line 32 and the negating feedback position signal on line 26. These two signals are summed and the resulting position error signal on line 41 is applied to a conventional servo compensation network, further referred to as compensator 42. The output signal on line 36 from the compensator 42 is a voltage applied as a control signal to a conventional voltage controlled oscillator (VCO) 44. As it has been described above with reference to FIG. 1, the control voltage on line 36 deter mines and is directly proportional to the rotational speed of the takeup reel 12. The output signal from the VCO 44 is applied on line 46 to a conventional motor drive amplifier 48, and the signal therefrom on line 50 to the previously described reel motor 30.

With further reference to the tension profiler 34 of the preferred embodiment of the invention shown in FIG. 2, it has sample and hold circuit 54 which may be implemented by a well known sample and hold device. During normal operation when the servo 28 is operating in a locked mode, as it has been previously described, the sample and hold 54 is enabled via line 38 and it receives the control voltage from the servo compensator 42 on line 36. The circuit 54 samples the received voltage at predetermined sampling intervals in a well known manner. The resulting analog signal samples are held by the sample and hold 54 and applied on line 56 to an analog-to-digital (A/D) converter 58. The converter 58 converts these analog signal values representing each sample to a corresponding digital value, preferably to an 8-bit binary signal. The resulting binary signal is applied on line 60 to address a programmable read only memory (PROM) 62 which stores the previously described tape tension profile values.

With further reference to PROM 62, it stores at each address designated by an output signal on line 60 from the A/D converter 58, a digital signal representative of a desired tape tension corresponding to a particular tape pack diameter designated by that address. The PROM 62 applies the thusly obtained output signals on line 64 to a digital-to-analog (D/A) converter 66. The converter 66 converts each digital signal into a corresponding analog signal value which is then applied as the previously described position command signal on line 32 to the servo 28. The servo 28 repositions the tension arm accordingly to a new desired position corresponding to the new position command signal, as previously described.

A conventional servo lock detector 68 is utilized, which receives the error signal on line 41 from the summing junction 40 and it determines whether the error signal is within a predetermined minimum distance, close to the desired position, for a predetermined length of time. When the above indicated condition exists, the detector 68 enables via line 38 the sample and hold 54, as it was previously described with reference to FIG. 1.

Now an alternative embodiment of the invention will be described with reference to FIG. 3. Because of the similarities with the previously described Figures, only the differences will be described. In this embodiment a control signal S on line 37 from the supply reel servo 29, which signal is proportional to the speed of rotation of the supply reel 11 shown in FIG. 1, is utilized, along with the previously described control signal on line 36 from the takeup reel servo 28, further designated as signal T. Because of the similarities between these servos 28, 29, the control signal S on line 37 is analogous with signal T on line 36, with the exception that signal S is taken from the supply reel servo. Both signals S and T on lines 36 and 37 respectively, are applied to a conventional analog divider 33, which provides a ratio S/T of these two signals in a well known manner. The resulting ratio from the analog divider 33 is applied on line 36a to the previously described tension profiler 34 as a control signal which has a known relationship to the diameter of the tape pack 22 on the takeup reel.

Consequently, the control signal on line 36a is proportional to a ratio of the supply reel speed to the takeup reel speed, while the dependence of that control signal on the tape speed is eliminated, as it has been described previously. As a result, the embodiment of FIG. 3 may be utilized in modes of operation when the tape speed is not maintained constant, that is, when the capstan servo is disengaged from driving the tape, such as in fast forward, rewind, shuttle and other operations.

Figure 3:
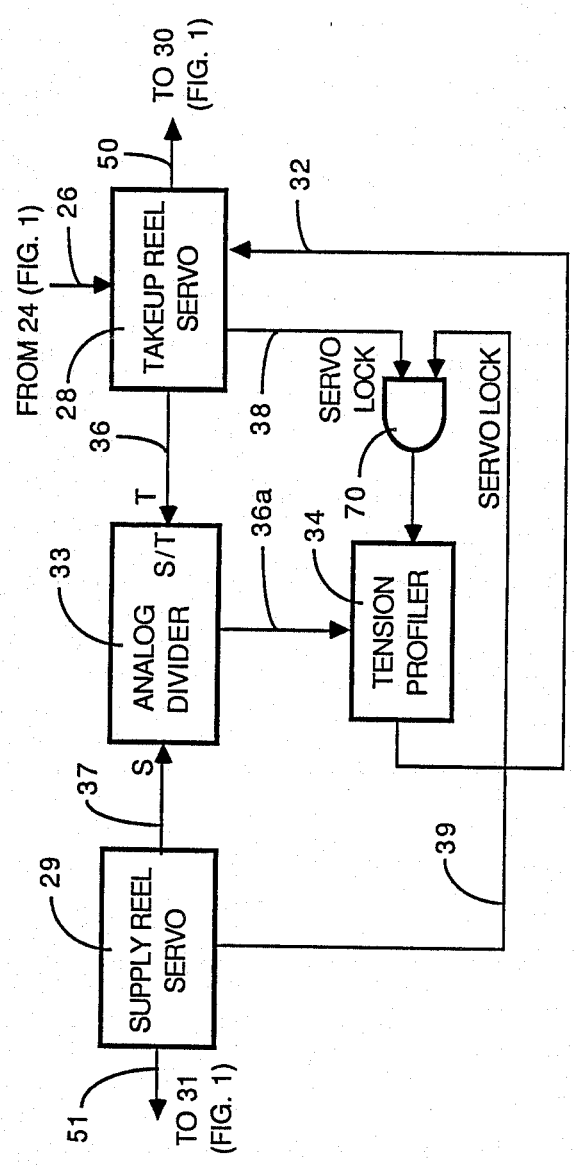
FIG. 3 is a functional block diagram showing an alternative embodiment of the invention, where a position command signal is obtained as a ratio of two signals.

It will be understood from the foregoing description that in the embodiment of FIG. 3 the tape tension profile values stored in the memory 62 shown in FIG. 2 will differ from those previously described. In this case the stored values corresponding to various takeup reel tape pack diameter values are derived from the ratio S/T defined by the ratio of the signal values on lines 37 and 36.

With further reference to FIG. 3, a signal on line 39 indicating that the supply reel servo 29 is in locked condition, is provided, in addition to the previously described takeup reel servo lock signal on line 38. Both these signals are applied via a logic AND gate 70 to enable operation of the tension profiler only after the previously described lock condition in both servos 28, 29 is obtained to prevent erroneous operation during start up or other non-stable running conditions.

Figure 4:
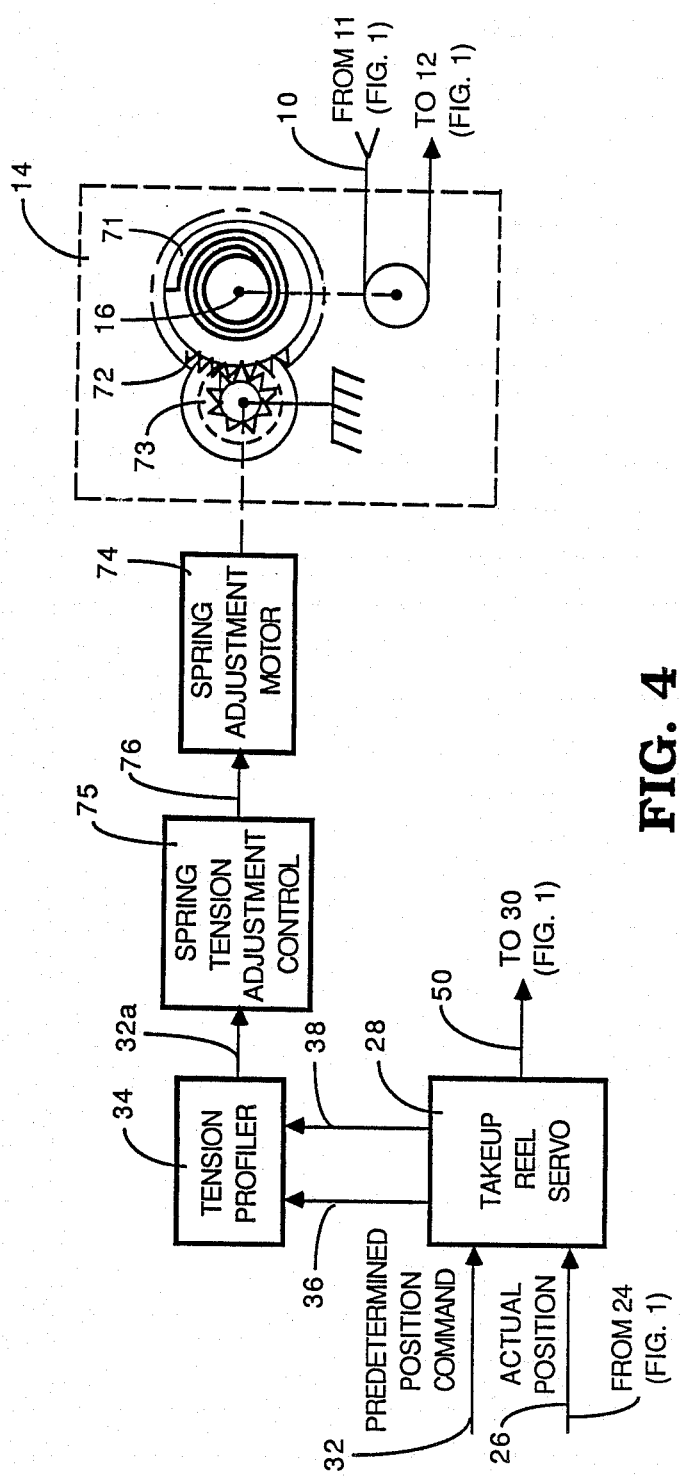
FIG. 4 is a block diagram showing a still alternative embodiment where a tension arm adjustment command is applied to adjust a tension arm spring.

FIG. 4 shows an alternative embodiment where the tension arm adjustment command from the tension profiler 34 is applied to adjust a tension arm spring 71. In this embodiment the position command signal on line 32 has a predetermined constant value, which is obtained for example by providing respective predetermined voltage values for various operation modes, such as record, playback, fast forward, or rewind. In this embodiment the tension arm 14 is shown as comprising a conventional tension arm spring, for example implemented as a watch spring 71 attached to the tension arm at the rotational axis 16. As it is known in the art, the spring is utilized to force the tension arm against the tape, thereby providing a desired tape tension. The spring 71 is housed in a housing which has a gear 72 provided around the outer periphery thereof. The gear 72 engages a pinion 73 which, in turn, is driven by a spring adjustment motor 74. The motor 74 is preferably implemented as a conventional stepper motor.

In the embodiment of FIG. 4 the tension profiler 34 stores values corresponding to desired spring tension values which in turn correspond to various control signal values on line 36, which have been previously described. The tape tension profiler 34 in response to a particular control signal value on line 36 from the takeup reel servo 28 applies a corresponding stored value as a tension arm adjustment command on line 32a to a spring tension adjustment control circuit 75. The circuit 75 responsively applies via line 76 a motor control signal to the spring adjustment motor 74. For example, the spring tension adjustment control circuit 75 applies a predetermined number of pulses on line 76 to the stepper motor 74, in response to each signal value on line 32a. The stepper motor in turn steps by a corresponding number of steps in a direction indicated by the signal on line 32a. The motor 74 drives the pinion 73 which engages the gear 72 attached to the spring 71. As a result, the spring is tightened or loosened, depending on the direction of stepping of the motor 74, thereby increasing or decreasing the force which the tension arm 14 applies on the tape 10.

It will be apparent from the foregoing disclosure that the tape tension control shown in FIG. 4 may be utilized with either embodiment of FIG. 1 or FIG. 3. While the embodiment of FIG. 4 is shown as being utilized in combination with the embodiment of FIG. 1, the following changes in the circuit will be provided when utilized with the embodiment of FIG. 3. Instead of applying the output signal from the tension profiler 34 to the takeup reel servo 28, as it is shown by line 32 in FIG. 3, that output signal will be applied via line 32a to the spring tension adjustment control 75. The other elements in FIG. 3 will remain substantially unchanged.

What is claimed is:

1. An apparatus for providing a desired tape tension for winding a tape on a reel, said desired tape tension varying with a changing diameter of a tape pack on said reel in accordance with a tape tension profile, comprising:

a tension arm arranged in contact with said tape and coupled to provide said desired tape tension in accordance with a tension arm adjustment command;

control means coupled to receive a position command signal indicating a desired position of said tension arm and a signal indicating an actual position of said tension arm, said control means providing responsively a control signal coupled to control rotation of said reel to thereby control said position of said tension arm, said control signal having a known relationship to said diameter of the tape pack on said reel; and tape tension profiler means having memory means for storing desired tape tension values in accordance with said tape tension profile, said tape tension profiler means coupled to said control means to receive therefrom said control signal and to apply responsively a corresponding stored tape tension value as said tension arm adjustment command.

2. The apparatus of claim 1 wherein said tape tension profiler means is coupled to apply said tension arm adjustment command to said control means as said position command signal.

3. The apparatus of claim 1 wherein said tension arm comprises an adjustable spring for providing said desired tape tension, and spring tension adjustment means coupled to adjust said tension of said spring, and wherein said tape tension profiler means is coupled to apply said tension arm adjustment command to said spring tension adjustment means.

4. The apparatus of claim 3 wherein:

said spring is and a pinion engaging said gear, and wherein said spring tension adjustment means comprises:

adjustment control means coupled to said tension profiler means to receive said tension arm adjustment command and to provide responsively a predetermined number of control pulses; and stepper motor means coupled to said adjustment control means to receive said control pulses, said stepper motor being coupled to drive said pinion a predetermined number of steps in response to said control pulses.

5. An apparatus for providing a desired tape tension for winding a tape on a reel, said desired tape tension varying with a changing diameter of a tape pack on said reel in accordance with a tape tension profile, comprising:

a tension arm having an adjustable position and arranged in contact with said tape for providing a desired tape tension corresponding to said position;

control means coupled to receive a position command signal indicating a desired position of said tension arm corresponding to a desired tape tension, and a signal indicating an actual position of said tension arm, said control means providing responsively a control signal coupled to control rotation of said reel to thereby control said position of said tension arm, said control signal having a known relationship to said diameter of the tape pack on said reel; and tape tension profiler means having memory means for storing desired tape tension values in accordance with said tape tension profile, said tape tension profiler means coupled to said control means to receive therefrom said control signal and to apply responsively a corresponding stored tape tension value to said control means as said position command signal.

6. The apparatus of claim 5 wherein said memory means has a plurality of addressable memory locations, each coupled to store a value representative of a desired tape tension in accordance with said tape tension profile, and wherein each said memory location is addressed by a different control signal value corresponding to a different diameter of said tape pack.

7. The apparatus of claim 5 wherein said tape tension profiler means comprises:

sample and hold means coupled to receive said control signal provided by said control means and to provide and hold analog samples of said control signal;

said memory means having a plurality of addressable memory locations, each coupled to store a digital value representative of a desired tape tension in accordance with said tape tension profile;

analog-to-digital converter means having an input coupled to receive said samples provided by said sample and hold circuit, to convert each received sample to a corresponding digital value and to apply said digital value to address said memory means; and digital-to-analog converter means coupled to receive from said memory means an output signal corresponding to a digital value stored at said memory location addressed by said analog-to-digital converter means, to convert said digital value to an analog signal and to apply said converted signal to said position servo means.

8. The apparatus of claim 5 wherein said tape has a substantially constant speed, and said control means comprises a position control servo, having:

summing means coupled to receive said position command signal and said signal indicating said actual position of the tension arm as a negative feedback signal, said summing means providing an error signal as a sum of said received signals;

voltage controlled oscillator means coupled to receive a signal responsive to said error signal as said control signal and to provide responsively an output signal; and motor means coupled to drive said reel and having an input coupled to receive said output signal of said voltage controlled oscillator means for controlling a rotational speed of said reel.

9. The apparatus of claim 8 wherein said memory means is a programmable read only memory.

10. The apparatus of claim 5, wherein said tape is wound between a supply reel and a takeup reel, and wherein said control means comprises a supply reel servo providing a first signal proportional to a speed of rotation of said supply reel, and a takeup reel servo providing a second signal proportional to a speed of rotation of said takeup reel, and a means coupled to receive said first and second signals and to provide a third signal as a ratio of said first and second signals, and to apply said third signal to said tension profiler means as said control signal.

11. The apparatus of claim 5 wherein said control means further comprises a detector means coupled to detect a position of said tension arm within a predetermined distance from said desired position, and to apply an enable signal to enable operation of said tension profiler means when said tension arm is within said predetermined distance for a predetermined time.

12. The apparatus of claim 10 wherein said supply reel servo and said takeup reel servo each comprises a detector means coupled to detect a servo lock condition when a tension arm associated with each said servo is within a predetermined distance from said desired position for a predetermined time, and to provide responsively a servo lock output signal, further comprising a means coupled to receive said output signal from each said detector means and to apply an enable signal to enable operation of said tension profiler means in response to both said servo lock output signals.

* * * * *

UNITED STATES PATENT AND TRADEMARK OFFICE
CERTIFICATE OF CORRECTION

PATENT NO. : 4,807,107

DATED : February 21, 1989

INVENTOR(S) : Jeffrey L. Fincher

It is certified that error appears in the above-identified patent and that said Letters Patent is hereby corrected as shown below:

Column 9, line 33, delete "is and" and insert --is adjustable by means of a gear and--.

Signed and Sealed this

Seventeenth Day of July, 1990

Attest:

HARRY F. MANBECK, JR.

*Attesting Officer*     Commissioner of Patents and Trademarks